(12) United States Patent
Fortin et al.

(10) Patent No.: US 8,480,148 B1
(45) Date of Patent: Jul. 9, 2013

(54) EXTERIOR VEHICLE BODY ASSEMBLY

(75) Inventors: Hugo Fortin, Commerce Township, MI (US); Brittany Forgue, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 18 days.

(21) Appl. No.: 13/410,912

(22) Filed: Mar. 2, 2012

(51) Int. Cl.
*B60J 9/00* (2006.01)

(52) U.S. Cl.
USPC ...................................................... 296/1.08

(58) Field of Classification Search
USPC ....... 296/1.08, 146.15, 201; 224/924; 49/502; 280/770; 362/494, 540, 545
See application file for complete search history.

(56) References Cited

U.S. PATENT DOCUMENTS

| | | | |
|---|---|---|---|
| 3,842,565 A | 10/1974 | Brown et al. | |
| 4,039,215 A * | 8/1977 | Minhinnick | 293/142 |
| 4,325,574 A | 4/1982 | Umemoto et al. | |
| 4,364,591 A | 12/1982 | Bien | |
| 4,391,464 A * | 7/1983 | Masotti et al. | 293/120 |
| 5,061,108 A * | 10/1991 | Bien et al. | 403/24 |
| 5,183,303 A | 2/1993 | Zoller | |
| 5,229,175 A | 7/1993 | Seabolt | |
| 5,238,268 A * | 8/1993 | Logan | 280/848 |
| 6,276,109 B1 * | 8/2001 | Hingorani et al. | 52/716.5 |
| 6,435,602 B1 * | 8/2002 | Sukegawa et al. | 296/191 |
| 6,974,238 B2 * | 12/2005 | Sturt et al. | 362/488 |
| 7,044,524 B2 * | 5/2006 | Luetze et al. | 296/1.08 |
| 7,207,617 B2 * | 4/2007 | Pelini | 296/29 |
| D575,200 S * | 8/2008 | Stahel | D12/114 |
| D582,818 S * | 12/2008 | Stahel | D12/114 |
| 7,540,550 B1 * | 6/2009 | Huber et al. | 296/29 |
| 7,611,162 B2 * | 11/2009 | Kim | 280/728.2 |
| 7,621,556 B2 * | 11/2009 | Itakura | 280/728.2 |
| 7,665,795 B2 * | 2/2010 | Shishikura | 296/180.1 |
| 7,726,717 B2 * | 6/2010 | Onuma et al. | 296/1.08 |
| 7,980,613 B2 * | 7/2011 | Murray et al. | 296/1.08 |
| 8,042,852 B2 * | 10/2011 | Onuma et al. | 296/1.08 |
| 8,087,721 B2 * | 1/2012 | Kralevich et al. | 296/198 |
| 8,157,303 B2 * | 4/2012 | Fortin | 293/115 |
| 8,235,568 B2 * | 8/2012 | Heiden et al. | 362/495 |
| 8,297,676 B2 * | 10/2012 | Osterhout et al. | 296/1.08 |
| 8,388,039 B2 * | 3/2013 | Gerndorf et al. | 296/1.08 |
| 8,414,048 B1 * | 4/2013 | Kwolek | 296/24.34 |
| 2008/0066266 A1 * | 3/2008 | Scroggie et al. | 24/297 |
| 2010/0176617 A1 * | 7/2010 | Khazaal et al. | 296/1.08 |
| 2013/0026791 A1 * | 1/2013 | Huber et al. | 296/193.09 |

OTHER PUBLICATIONS

U.S. Appl. No. 13/188,140, Inoue et al.
Exerpt from the 2012 Lincoln NKZ Service Manual (2 pages).
Image of the 2013 Lincoln MKZ Upper Radiator Grille (1 page).

* cited by examiner

*Primary Examiner* — Kiran B Patel
(74) *Attorney, Agent, or Firm* — Global IP Counselors, LLP

(57) ABSTRACT

An exterior vehicle body assembly comprises a vehicle body panel and an exterior vehicle trim. The vehicle body panel includes a first mounting portion having a first pivot structure and a first attachment structure spaced from the first pivot structure. The exterior vehicle trim includes a second mounting portion having a second pivot structure and a second attachment structure. The second pivot structure mates with the first pivot structure such that the exterior vehicle trim is pivotally supported about a pivot axis defined by the mating of the first and second pivot structures between an initial installation position and a final installed position. The pivot axis extends in a vehicle heightwise direction of the exterior vehicle body assembly, and the first and second attachment structures are aligned with each other with the exterior vehicle trim being in the final installed position with respect to the vehicle body panel.

20 Claims, 14 Drawing Sheets

EXTERIOR VEHICLE BODY ASSEMBLY

BACKGROUND

1. Field of the Invention

The present invention generally relates to an exterior vehicle body assembly. More specifically, the present invention relates to an exterior vehicle body assembly including an exterior vehicle trim that pivotally mounts to a vehicle body panel to pivot into an installed position.

2. Background Information

For many years, automotive vehicles have been provided with numerous exterior body panels, exterior fascia panels, exterior trim pieces and so on that couple together to form the exterior of the vehicle body. In recent years, it has been desirable to make vehicles with a smooth exterior shape, in which the bumpers, exterior vehicle components and exterior vehicle trim are integrated with the overall shape of the vehicle body. Thus, it is desirable to couple exterior trim pieces to the exterior vehicle components in a relatively smooth manner so that the exterior trim pieces integrate into the overall outer shape of the vehicle body. In one example, mounting brackets can be used to attach exterior trim pieces to the exterior vehicle body components.

In view of the above, it will be apparent to those skilled in the art from this disclosure that there exists a need for an improved exterior vehicle body assembly. This invention addresses this need in the art as well as other needs, which will become apparent to those skilled in the art from this disclosure.

SUMMARY

Accordingly, in view of the state of the known technology, one aspect of the present invention is to provide an exterior vehicle body assembly comprising a vehicle body panel and an exterior vehicle trim. The vehicle body panel includes a first mounting portion having a first pivot structure and a first attachment structure, with the first attachment structure being spaced from the first pivot structure. The exterior vehicle trim includes a second mounting portion having a second pivot structure and a second attachment structure. The second pivot structure mates with the first pivot structure such that the exterior vehicle trim is pivotally supported about a pivot axis defined by the mating of the first and second pivot structures between an initial installation position and a final installed position. The pivot axis extends in a vehicle heightwise direction of the exterior vehicle body assembly, and the first and second attachment structures are aligned with each other with the exterior vehicle trim being in the final installed position with respect to the vehicle body panel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
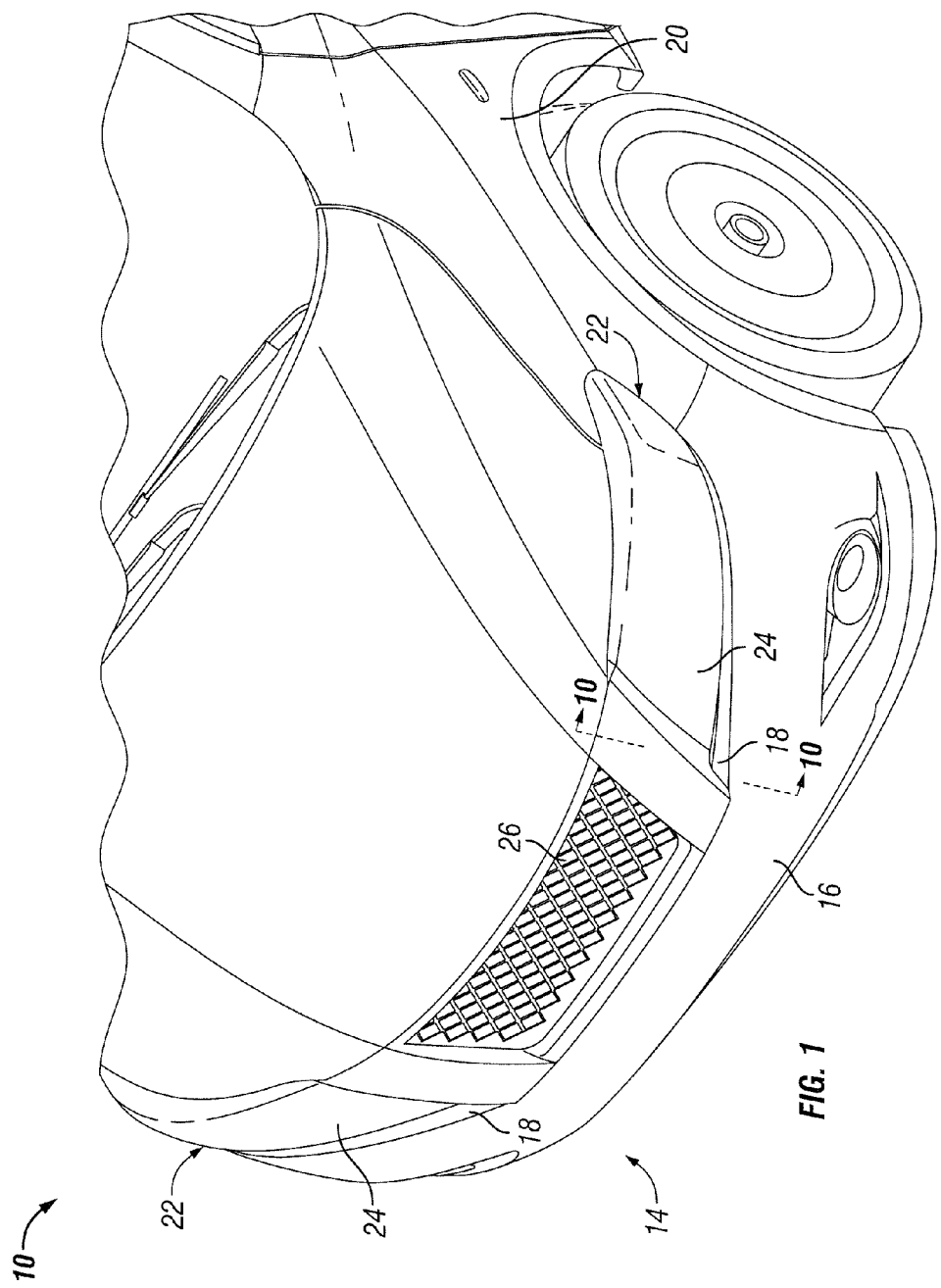
FIG. 1 is a front perspective view of a vehicle equipped with an exterior vehicle body assembly in accordance with a disclosed embodiment.
Figure 2:
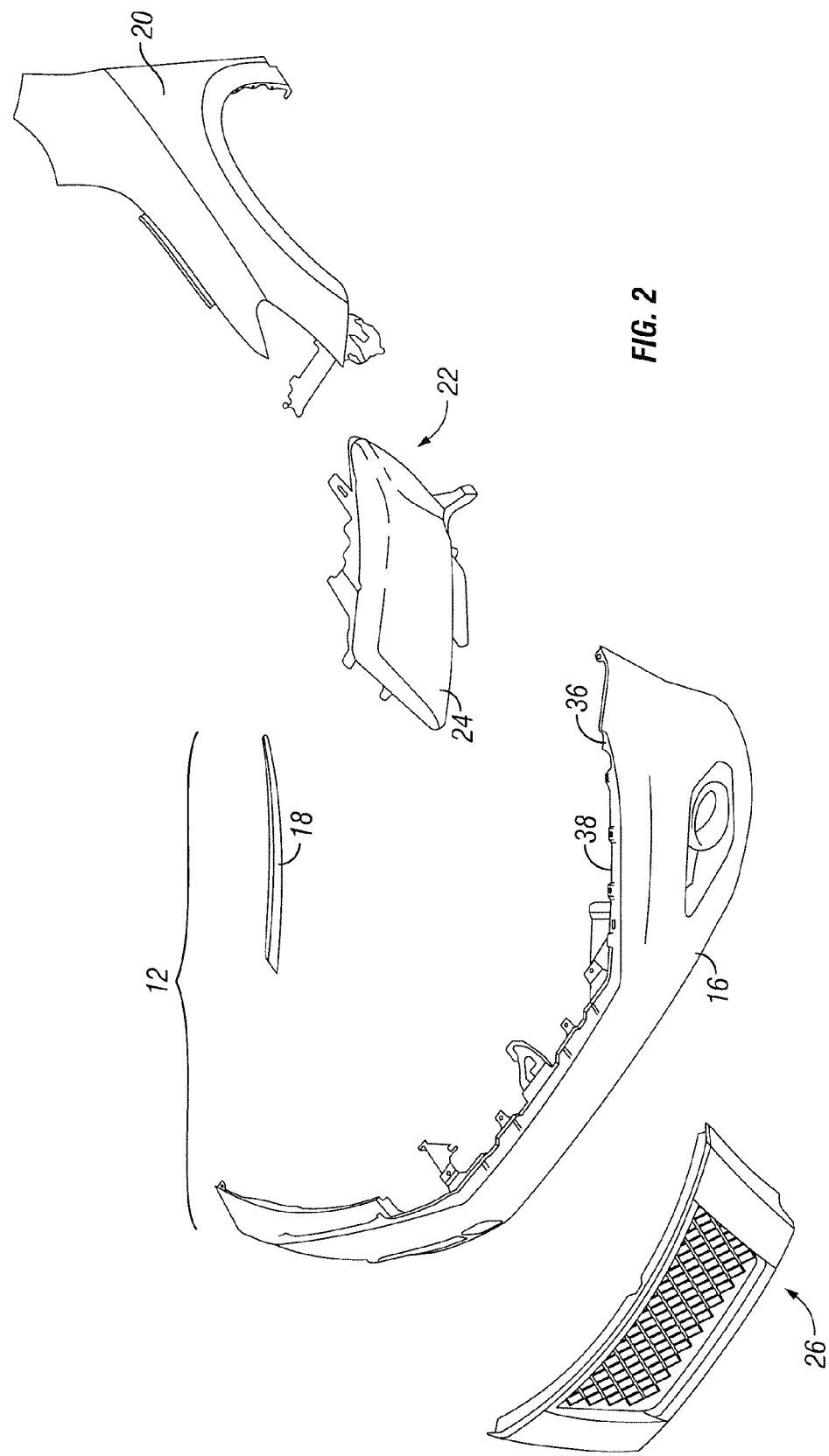
FIG. 2 is an exploded front perspective view of selected parts of the exterior vehicle body assembly illustrated in FIG. 1.

Referring initially to FIGS. 1 and 2, an automotive vehicle 10 is illustrated with an exterior vehicle body assembly 12 in accordance with one embodiment. The vehicle 10 can be, for example, an SUV, an automobile, a truck, a van or any other suitable vehicle. The vehicle 10 is conventional, except for the exterior vehicle body assembly 12 as described herein. Accordingly, the vehicle 10 and its various parts will not be discussed and/or illustrated in detail herein, except as related to the exterior vehicle body assembly 12.

As illustrated, a vehicle front end 14 of the vehicle basically includes a front bumper fascia panel 16, which can be referred to generally as a vehicle body panel 16, and exterior vehicle trim 18 mounted at each end of the bumper fascia panel 16. As discussed in more detail below, the exterior vehicle body assembly 12 in this example includes the vehicle body panel 16 and an exterior vehicle trim 18. The vehicle front end 14 further includes a pair of fender body panels 20, a pair of front head lamp assemblies 22 each having a lens 24, and a vehicle grille 26. The exterior vehicle trim 18, the fender body panels 20 and the head lamp assemblies 22 are substantially mirror images of each other.

The bumper fascia panel (vehicle body panel) 16, the fender body panels 20 and head lamp assemblies 22 can be mounted to the vehicle front end 14 in any conventional manner as understood in the art. For example, the bumper fascia panel 16 can be attached to and supported by a radiator core support (not shown) that constitutes part of a vehicle front end module and supports the bumper fascia panel 16. Also, the bumper fascia panel 16 can be attached to and supported by any other suitable component of the vehicle front end 14. The bumper fascia panel 16 can be a one-piece, unitary member formed of a thin, lightweight sheet material such as a rigid plastic material (e.g., a thermoplastic olefin elastomer) or any other suitable material. Likewise, the exterior vehicle trim 18 can be a one-piece, self-supporting unitary member formed of a thin, lightweight sheet material such as a rigid plastic material (e.g., a thermoplastic olefin elastomer) or any other suitable material. Thus, the vehicle body panel 16 includes the front bumper fascia panel and the exterior vehicle trim 18 includes a fascia molding member.

It should be further noted that the term "exterior vehicle trim" refers to an exterior vehicle component that is mounted to the vehicle body panel 16 in a non-movable fixed position to accent the vehicle body panel 16. Accordingly, the term "exterior vehicle trim" does not refer to components such as fuel filler lids, vehicle doors, exterior vehicle panels and so on that can move between closed and open positions. In any case, the bumper fascia panel 16 and the exterior vehicle trim 18 should be constructed of a self supporting material with a degree of flexibility such that the bumper fascia panel 16 and exterior vehicle trim 18 are flexible yet maintain their respective shapes. The bumper fascia panel 16 can typically cover a rigid bumper member (not shown). The head lamp assemblies 22 can be attached to the bumper fascia panel 16 and to the respective fender body panels 20 in any suitable manner, such as by bolts, screws or any other suitable types of fasteners.

Features of the exterior vehicle body assembly 12 pertaining to a first side (e.g., a driver's side in right-hand drive jurisdictions) of the vehicle 10 will now be discussed in detail for exemplary purposes. The exterior vehicle body assembly 12 at a second side (or front passenger side in this example) of the vehicle 10 is substantially a mirror image of the exterior vehicle body assembly 12 at the first side of the vehicle 10 and thus will not be discussed in detail. Hence, it will be apparent to those skilled in the automotive art from this disclosure that the descriptions and illustrations of the bumper fascia panel 16 and exterior vehicle trim 18 apply to both the driver's side and the front passenger side of the bumper fascia panel 16 and to the exterior vehicle trim 18 at both the driver's side and the front passenger side of the vehicle 10.

Figure 3:
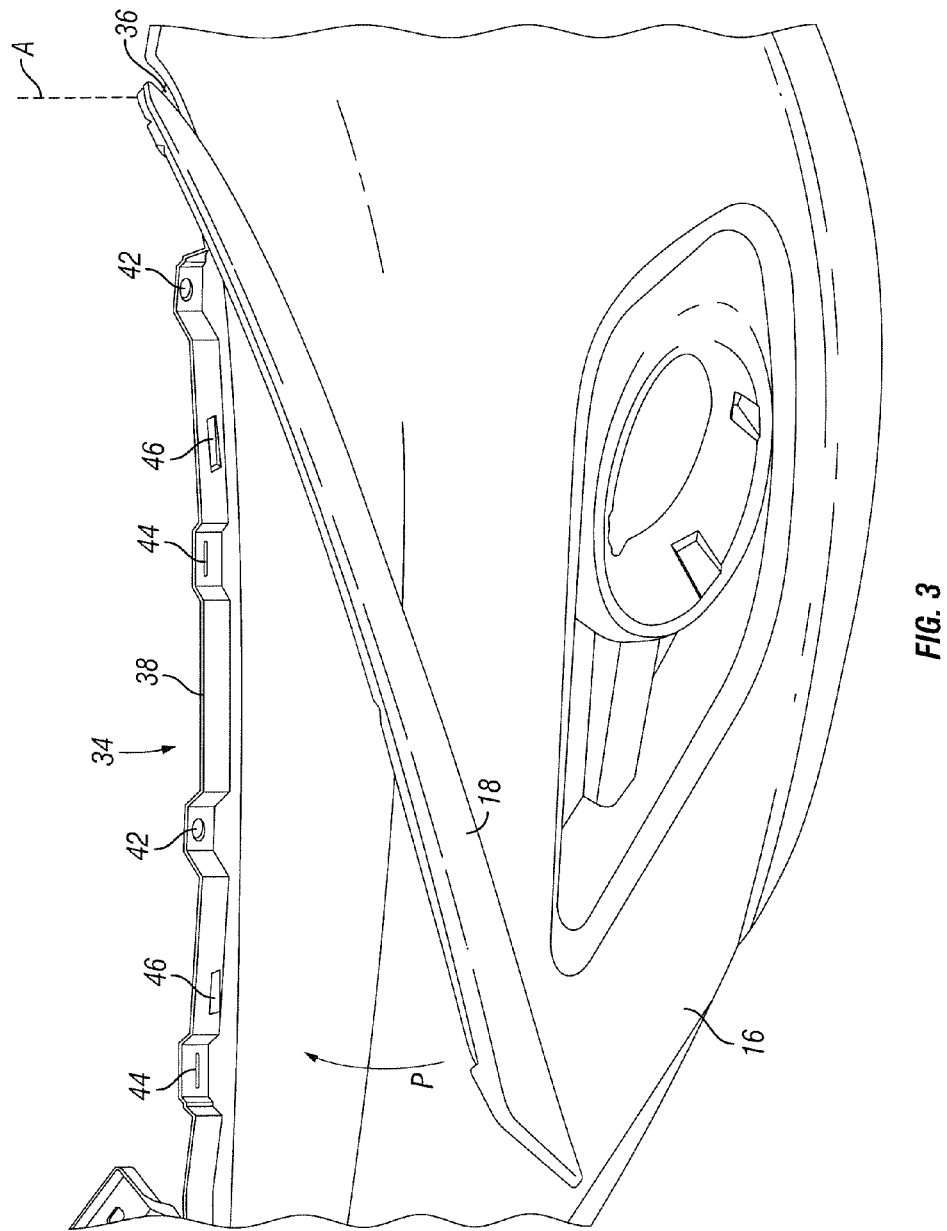
FIG. 3 is a detailed front perspective view of a first side (or driver's side) of the vehicle shown in FIG. 1 with an exterior vehicle trim being installed.
Figure 4:
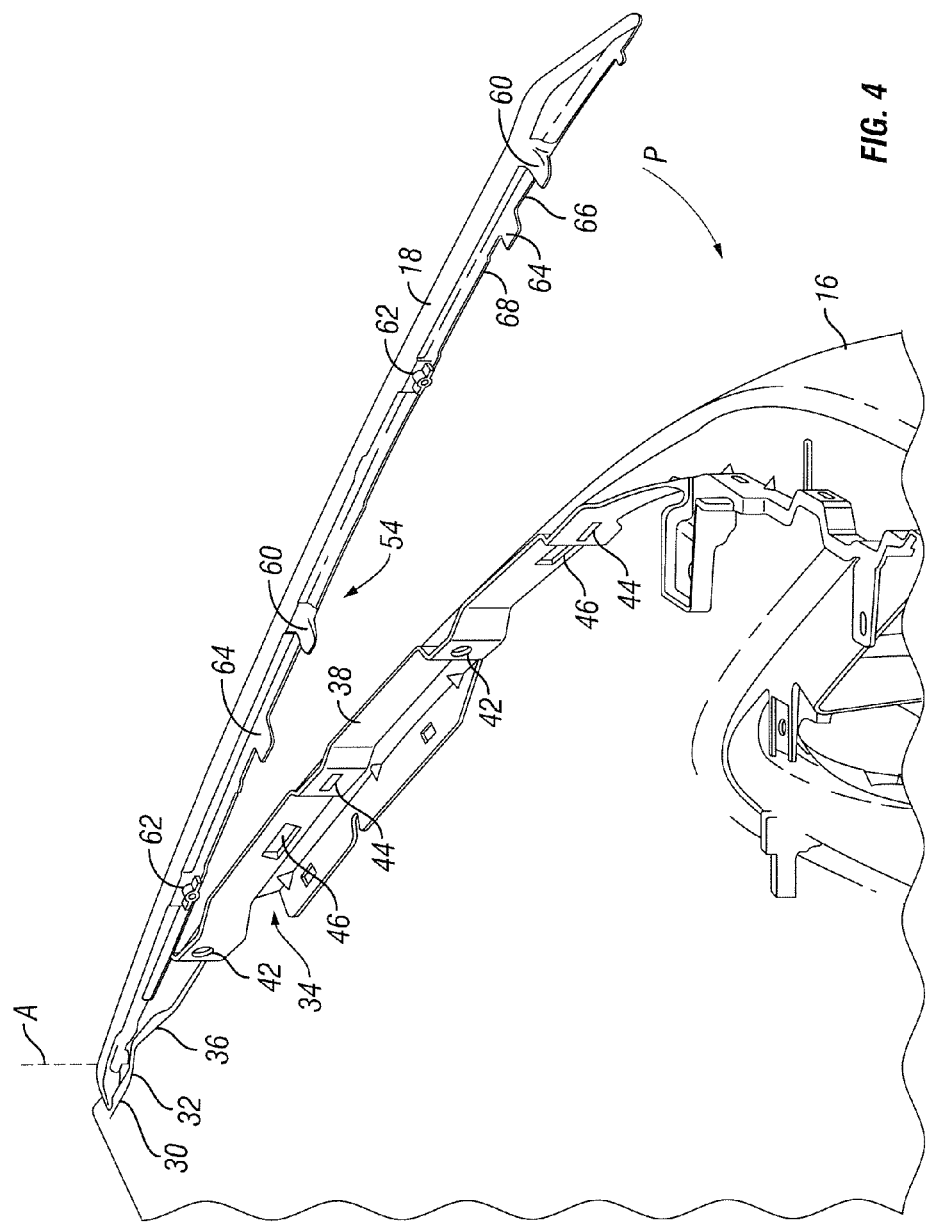
FIG. 4 is a detailed rear perspective view of a the first side of the vehicle shown in FIG. 1 with an exterior vehicle trim being installed.
Figure 5:
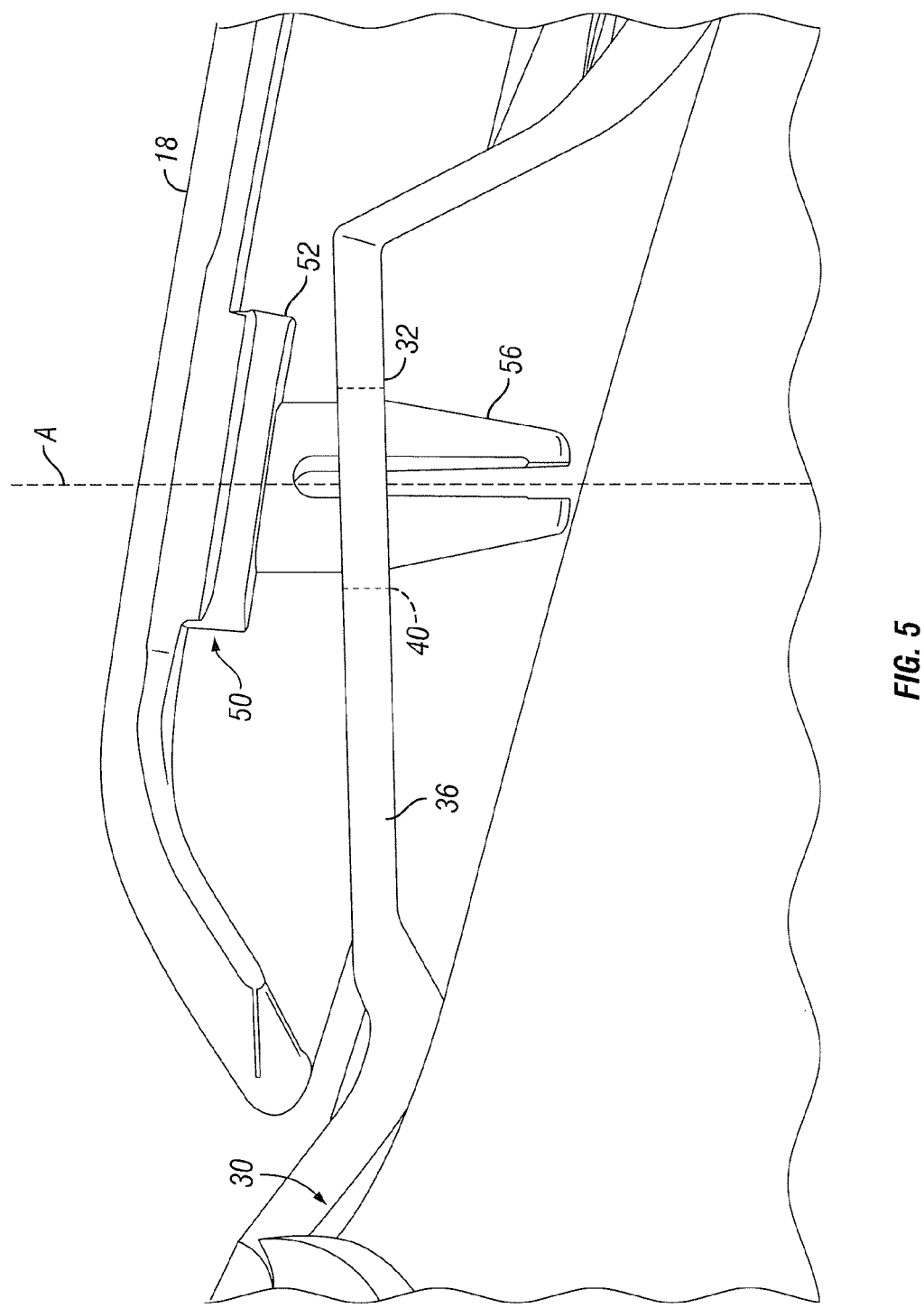
FIG. 5 is a detailed rear elevational view of pivot structures defined by the exterior vehicle trim and front bumper fascia panel of the vehicle shown in FIG. 1.
Figure 6:
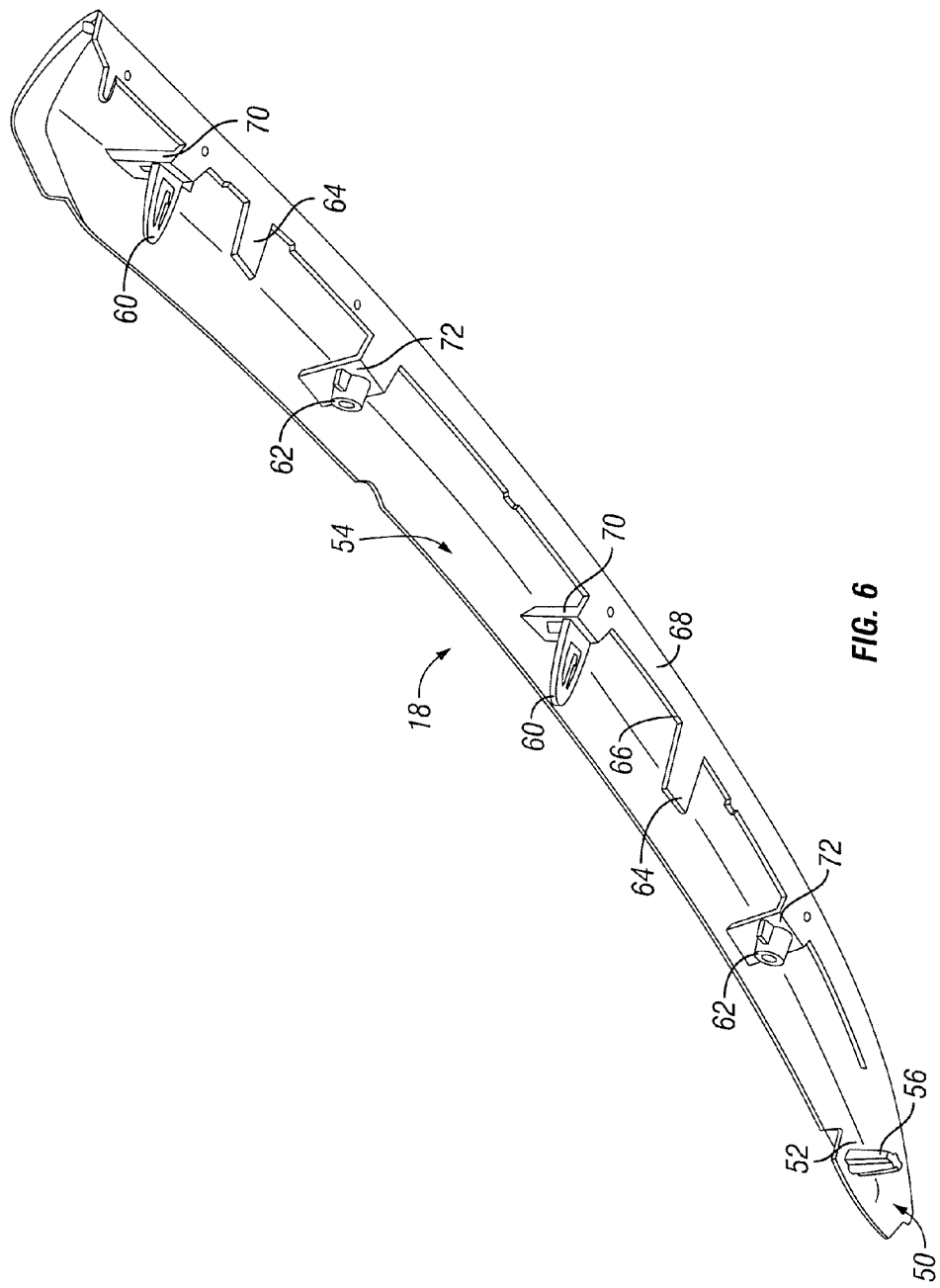
FIG. 6 is a rear perspective view of the exterior vehicle trim as shown in FIGS. 1-5.

As shown, for example, in FIGS. 3-5, the vehicle body panel 16 includes a first mounting portion 30 having a first pivot structure 32 and a first attachment structure 34. The first attachment structure 34 is laterally spaced from the first pivot structure 32. In particular, the first attachment structure 34 is positioned inboard of the first mounting portion 30 on the vehicle body panel 16. That is, in this example, the vehicle body panel 16 further comprises a first attachment flange 36 and a second attachment flange 38 that is positioned inboard of the first attachment flange 36. The first attachment flange 36 includes the first pivot structure 32, and extends horizontally in the widthwise and lengthwise directions of the vehicle 10. The second attachment flange 38 includes the first attachment structure 34 and extends in the vehicle heightwise direction which can be normal to or at least transverse to the first attachment flange 36. In this example, the first pivot structure 32 defines a pivot opening 40. Also, in this example, the first attachment structure 34 defines an attachment opening, which can be a fastener opening 42, a projection opening 44 or a locating opening 46 spaced from each other along the first attachment structure 34. As further illustrated, the first attachment structure 34 defines a plurality of fastener openings 42, a plurality of projection openings 44 and a plurality of locating openings 46.

As further shown in FIGS. 3 through 9, the exterior vehicle trim 18 includes a second mounting portion 50 having a second pivot structure 52 and a second attachment structure 54. The second pivot structure 52 mates with the first pivot structure 32 such that the exterior vehicle trim 18 is pivotally supported about a pivot axis A defined through a center of the pivot opening 40. In this example, the second pivot structure includes a pivot projection 56 that mates with the first pivot structure 32 about the pivot opening 40. However, as can be appreciated by one skilled in the art, the first pivot structure 32 can include the pivot projection 56 and the second pivot structure 52 can include the pivot opening 40. Accordingly, with the pivotal mating of the first and second pivot structures 32 and 52, the exterior vehicle trim 18 is pivotally supported about the pivot axis A to pivot in a direction P between an initial installation position as shown, for example, in FIGS. 3 and 4 and a final installed position as shown, for example, in FIGS. 1 and 7 through 9. In this example, the exterior vehicle trim 18 is situated at least partially between a lens 24 of the front head lamp 22 and the front bumper fascia panel (vehicle body panel) 16 in the final installed position. The pivot axis A extends in the vehicle heightwise direction of the exterior vehicle body assembly 12 and thus, in the vehicle heightwise direction of the vehicle 10. Also, the first and second attachment structures 34 and 54 are aligned with each other with the exterior vehicle trim 18 being in the final installed position with respect to the vehicle body panel 16 as shown, for example, in FIGS. 7 through 9.

That is, in this example, the second attachment structure 54 defines an attachment projection, which can be a projection 60, a fastening boss 62 or a locating projection 64 spaced from each other along the second attachment structure 54. Thus, when the exterior vehicle trim 18 is pivoted into the final installed position, the projection 60 aligns with the projection opening 44, the fastening boss 62 aligns with the fastener opening 42, and the locating projection aligns with the locating opening 46. As further illustrated, the second attachment structure 54 includes a plurality of projections 60, a plurality of fastening bosses 62 and a plurality of a locating projections 64 that align with the plurality of projection openings 44, the plurality of fastener openings 42 and the plurality of locating openings 46, respectively. Naturally, the second attachment structure 54 can define any or all of the fastener openings 42, the projection openings 44, and the locating openings 46. Likewise, the first attachment structure 34 can define any or all of the projections 60, the fastening bosses 62 and the locating projections 64.

Figure 7:
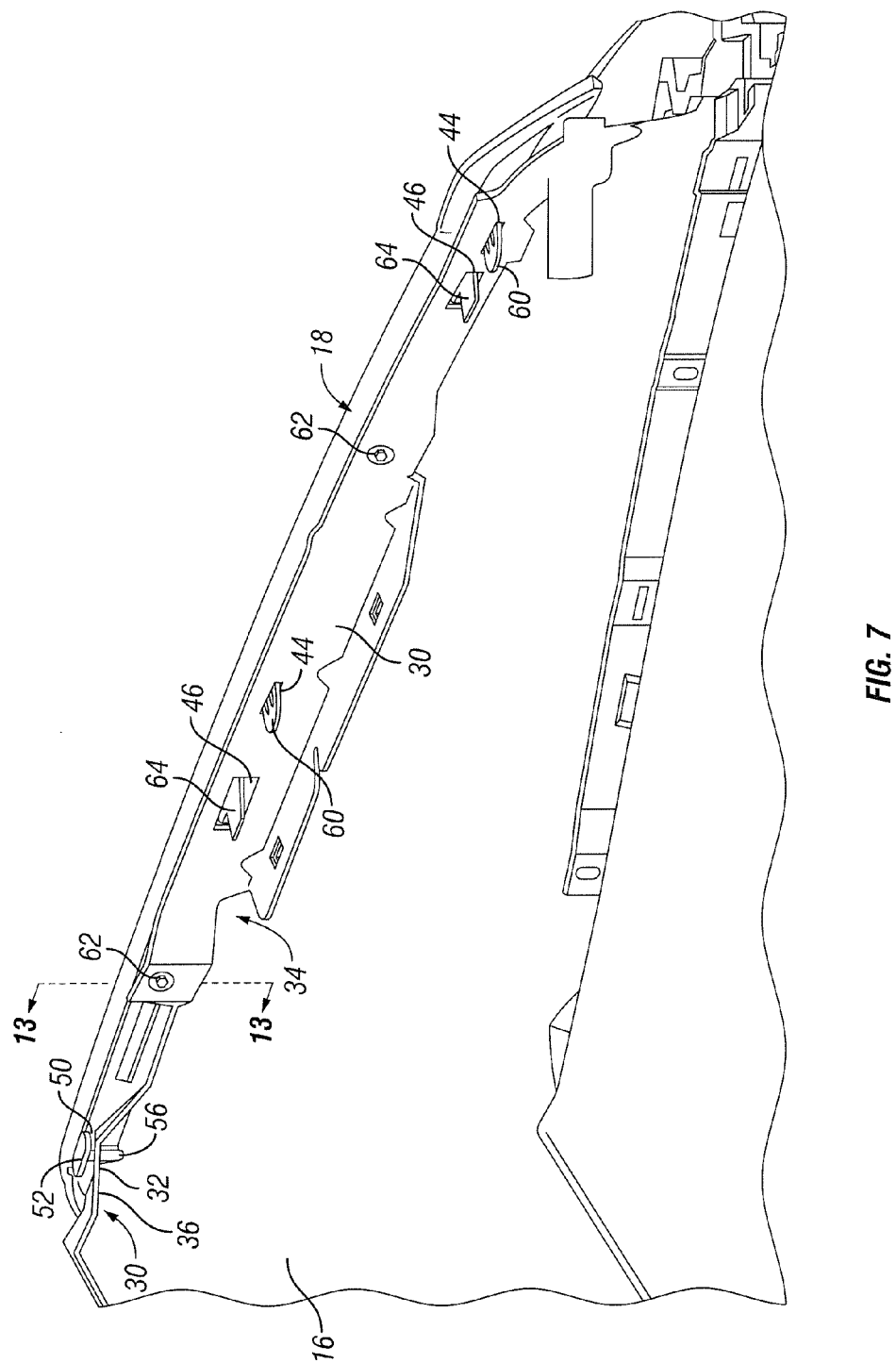
FIG. 7 is a rear perspective view of the exterior vehicle trim in a final installed position.
Figure 8:
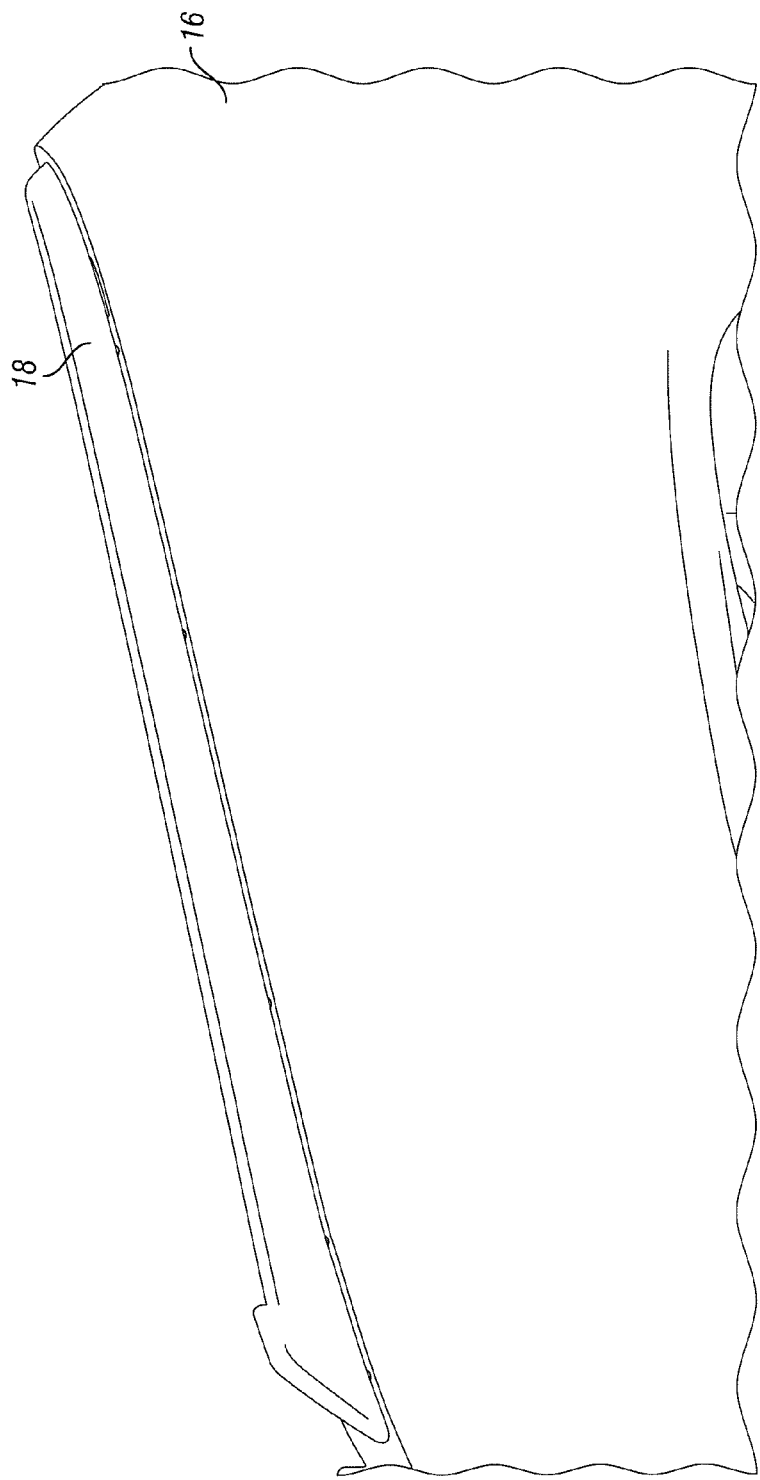
FIG. 8 is a front elevational view of the exterior vehicle trim in a final installed position.
Figure 9:
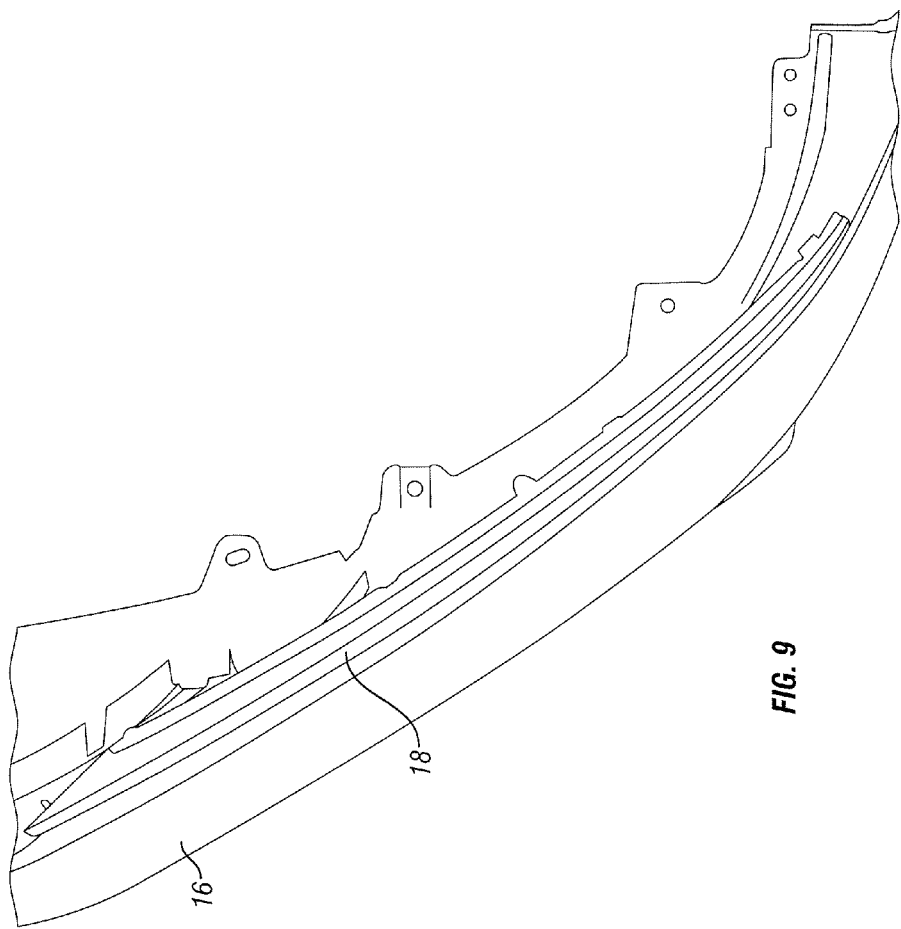
FIG. 9 is a plan view of the exterior vehicle trim in a final installed position.

As can be appreciated from FIGS. 4 and 7, for example, the locating projections 64 extend outward from a rear surface 66 of the exterior vehicle trim 18. For instance, the locating projections 64 can extend outward from the rear surface 66 of a lower flange 68 that extends at least partially along a length of the exterior vehicle trim 18. Also, the projections 60 can extend from flanges 70 that extend transverse to the lower flange 68. Similarly, the fastening bosses 62 can extend from flanges 72 that extend transverse to the lower flange 68. In this example, the locating projections 64 extend further outward from the exterior vehicle trim 18 than do any of the projections 60 and fastening bosses 62. Accordingly, the locating projections 64 are received into the respective locating openings 46 to assist in positioning the exterior vehicle trim 18 into the final installed position. Moreover, since the locating openings 46 and the locating projections 64 may perform more of a locating function than an attachment function, the locating openings 46 and the locating projections 64 can be interpreted as being separate from the first and second attachment structures 34 and 54.

Figure 10:
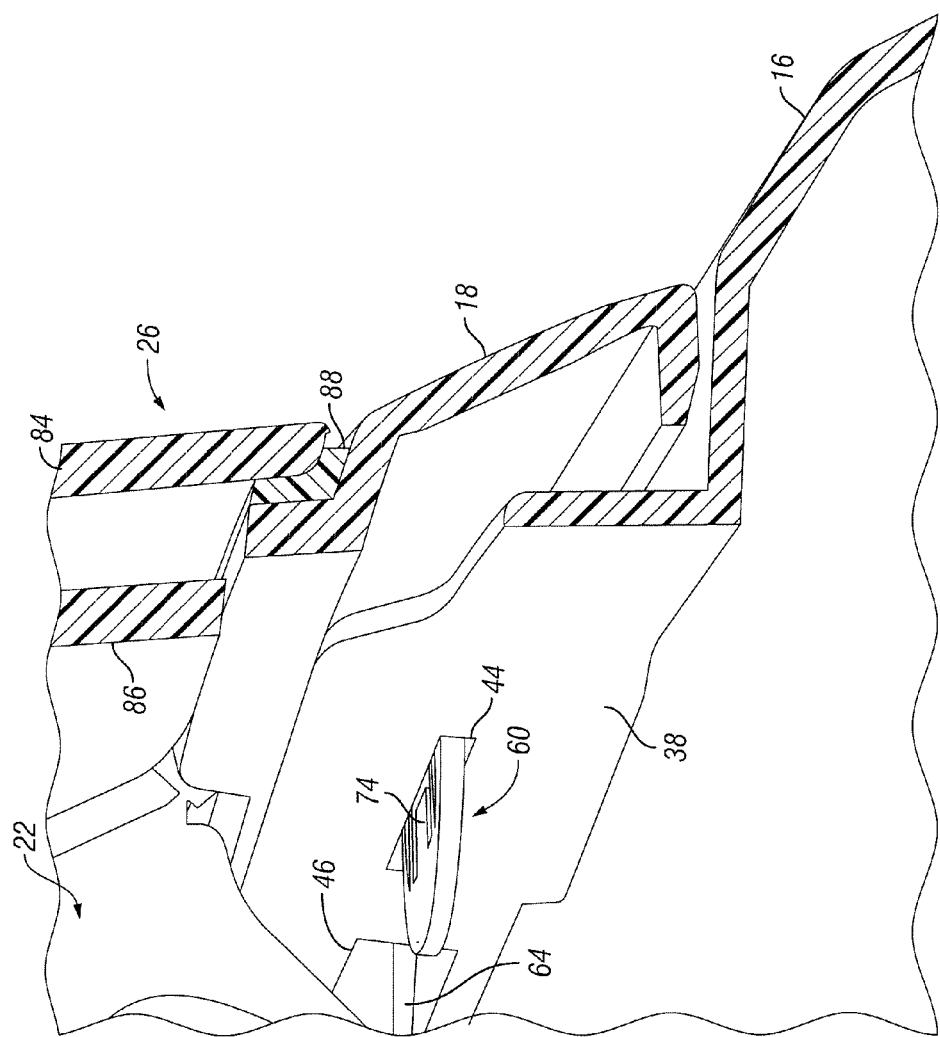
FIG. 10 is a detailed cross-sectional perspective view of the exterior vehicle trim in the final installed position, showing a projection of the exterior vehicle trim engaged with an opening in the front bumper fascia panel.
Figure 11:
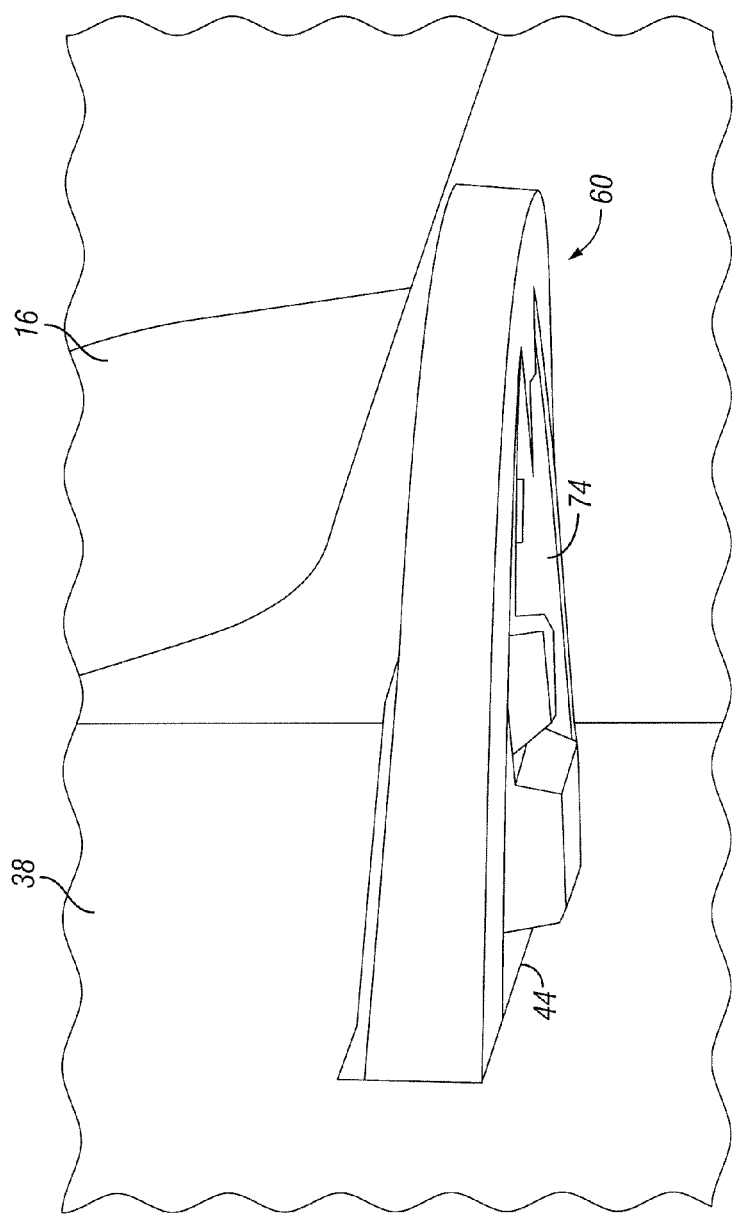
FIG. 11 is a detailed perspective view further showing a projection of the exterior vehicle trim engaged with an opening in the front bumper fascia panel.
Figure 12:
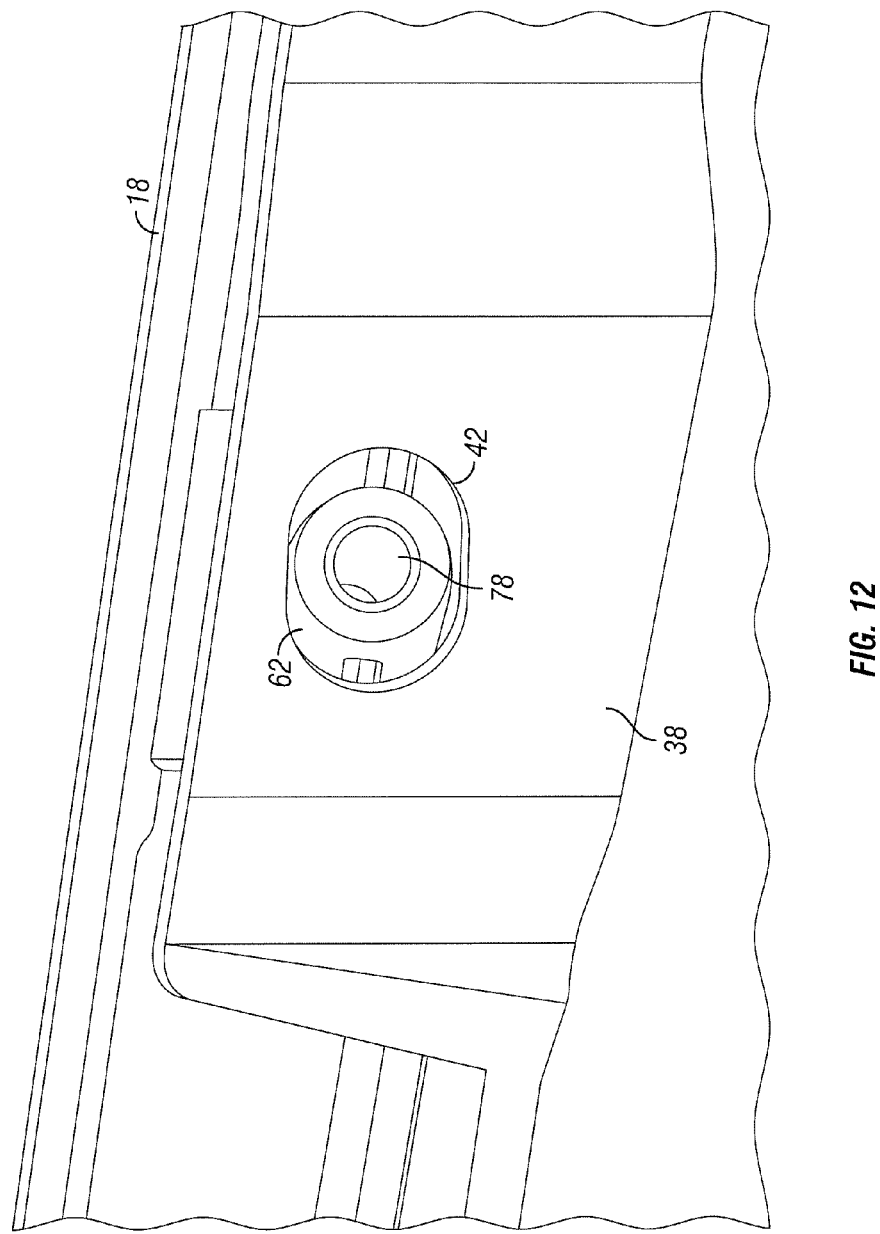
FIG. 12 is a detailed perspective view of the exterior vehicle trim in the final installed position showing a fastening boss of the exterior vehicle trim aligning with a fastener opening in the front bumper fascia panel.
Figure 13:
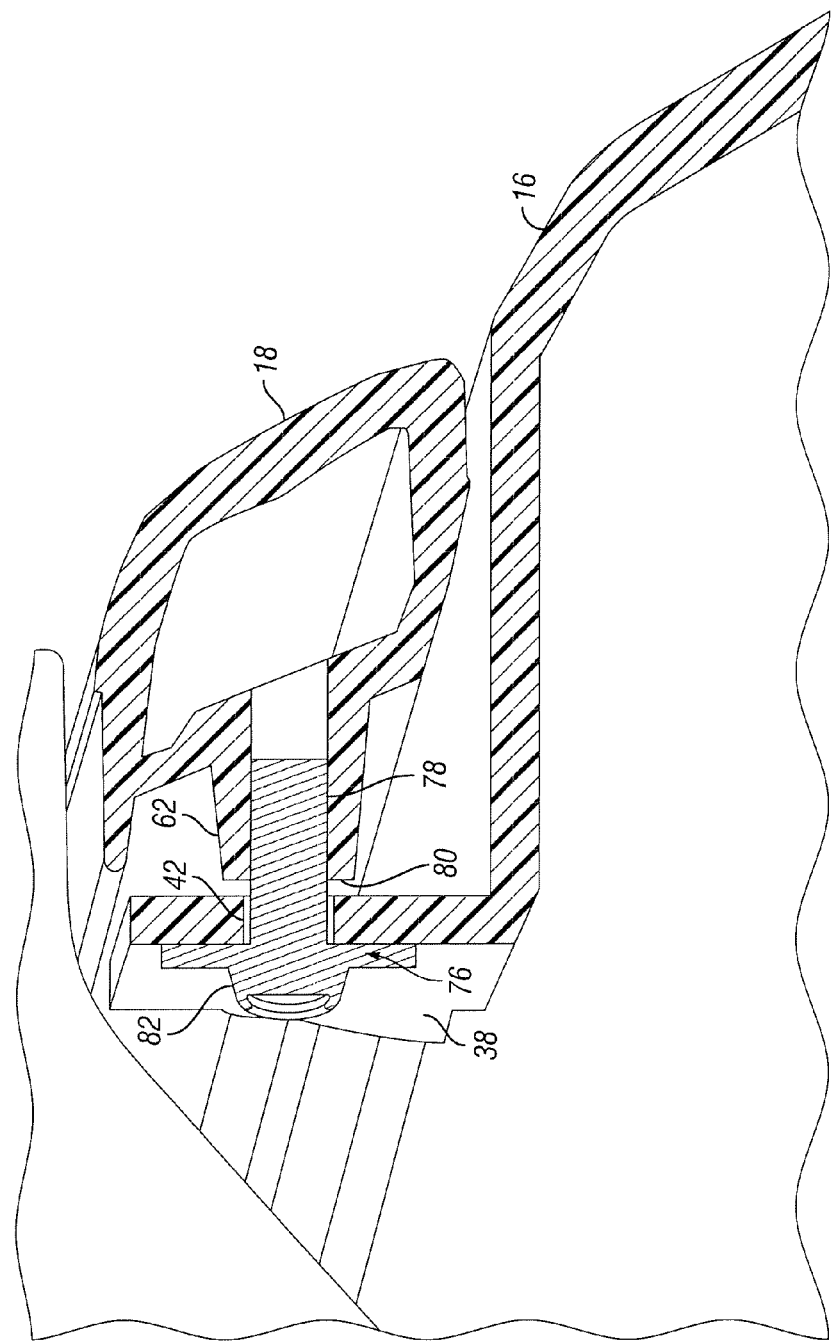
FIG. 13 is a detailed cross-sectional perspective view of the exterior vehicle trim in the final installed position, showing a fastener engaged with a fastening boss of the exterior vehicle trim.

In addition, as shown in more detail in FIGS. 10 and 11, at least one of the projections 60 can include a snap-fit clip 74 that engages in a snap-fit manner with an edge that defines the fastener opening 42 with the exterior vehicle trim 18 being in the final installed position. Furthermore, as shown in more detail in FIGS. 12 and 13, at least one fastener 76 extends through at least one of the fastener openings 42 and couples with a fastening boss 62 to secure the exterior vehicle trim 18 and the vehicle body panel 16 together. That is, the fastening boss 62 can include an aperture 78 and the fastener 76 includes a bolt 80 that is received into the aperture 78. The head 82 of the bolt 80 is larger than the fastener opening 42. Also, the aperture 78 can be threaded so that the bolt 80 can be screwed into the aperture 78 to secure the exterior vehicle trim 18 and the vehicle body panel 16 together.

Figure 14:
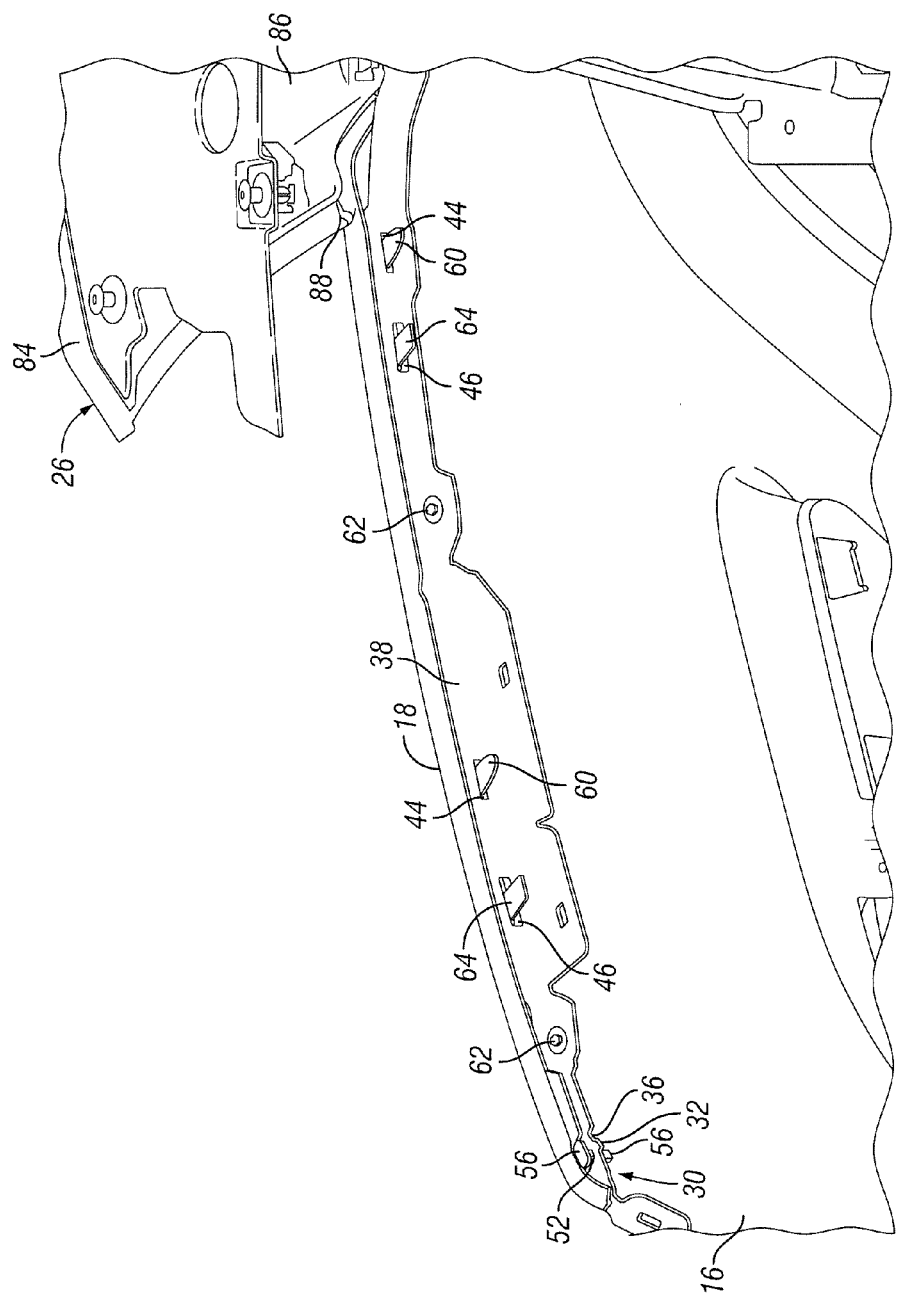
FIG. 14 is a rear perspective view illustrating a vehicle grille installed to the front bumper fascia and overlaying an inboard end of the exterior vehicle trim.

As further shown in FIGS. 1, 10 and 14, the vehicle grille 26 can be mounted to the vehicle body panel 16 using screws, bolts or any other suitable fasteners as understood in the art. Furthermore, the vehicle grille 26 can overlay an inboard end of the exterior vehicle trim 18 such that the exterior vehicle trim 18 is situated at least partially between the vehicle grille 26 and the vehicle body panel 16 in the final installed position. As best shown in FIG. 10, the vehicle grille 26 can include an outer member 84 that is fixed to an inner member 86. A seal 88 can also be situated between the vehicle grille 26 and the exterior vehicle trim 18 to prevent water and debris from penetrating between the two components.

Accordingly, as can be appreciated from the description herein, the exterior vehicle body assembly 12 provides improved fit and finish, and allows for increased ease of assembly. Also, the vehicle body assembly 12 eliminates the need for additional brackets to attach the exterior vehicle trim (front bumper fascia molding) 18 to the vehicle body panel (front bumper fascia panel) 16, thus decreasing overall vehicle cost. In addition, the decrease in structural complexity of the exterior vehicle body assembly 12 allows for easier and more cost efficient servicing. Furthermore, the limited packaging shape and unique design of the exterior vehicle trim 18, and the first pivot structure 32 and the first attachment structure 34 of the vehicle body panel 16, enable the exterior vehicle trim 18, the first pivot structure 32 and the first attachment structure 34 to fit in a limited area below the lens 24. Moreover, the pivot axis A created by the mating of the first pivot structure 32 and the second pivot structure 52 acts as a datum or a fixed reference point on the outboard side of the vehicle body panel 16 and the exterior vehicle trim 18. Therefore, the effect of any variation in the mating of the vehicle body panel 16, the exterior vehicle trim 18, the fender body panel 20 and the headlamp assembly 22 is manifested at the inboard side of the vehicle body panel 16 and the exterior vehicle trim 18 which is concealed from view behind the vehicle grille 26. Accordingly, the multi-directional datum improves the appearance, fit and finish, and ease of installation of the exterior vehicle body assembly 12.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An exterior vehicle body assembly comprising:
    a vehicle body panel including a first mounting portion having a first pivot structure and a first attachment structure, the first attachment structure being spaced from the first pivot structure; and
    an exterior vehicle trim including a second mounting portion having a second pivot structure and a second attachment structure, the second pivot structure mating with the first pivot structure such that the exterior vehicle trim is pivotally supported about a pivot axis defined by the mating of the first and second pivot structures between an initial installation position and a final installed position, the pivot axis extending in a vehicle heightwise direction of the exterior vehicle body assembly, and the first and second attachment structures being aligned with each other with the exterior vehicle trim being in the final installed position with respect to the vehicle body panel.

2. The exterior vehicle body assembly according to claim 1, wherein one of the first and second pivot structures defines a pivot opening and the other of the first and second pivot structures includes a pivot projection that mates with the opening.

3. The exterior vehicle body assembly according to claim 1, wherein
one of the first and second attachment structures defines an attachment opening and the other of the first and second attachment structures includes an attachment projection that aligns with the opening with the exterior vehicle trim being in the final installed position.

4. The exterior vehicle body assembly according to claim 1, wherein
the first attachment structure is positioned inboard of the first mounting portion on the vehicle body panel.

5. The exterior vehicle body assembly according to claim 1, wherein
the vehicle body panel further comprises a first attachment flange and a second attachment flange, the first attachment flange extending horizontally and including the first pivot structure, and the second attachment flange extending in the vehicle heightwise direction and including the first attachment structure.

6. The exterior vehicle body assembly according to claim 5, wherein
the second attachment flange is positioned inboard of the first attachment flange on the vehicle body panel.

7. The exterior vehicle body assembly according to claim 1, wherein
one of the first and second attachment structures defines a projection opening and the other of the first and second attachment structures defines a projection that engages is received within the projection opening with the exterior vehicle trim being in the final installed position.

8. The exterior vehicle body assembly according to claim 7, wherein
the projection includes a snap-fit clip that engages in a snap-fit manner with an edge that defines the projection opening with the exterior vehicle trim being in the final installed position.

9. The exterior vehicle body assembly according to claim 1, wherein
one of the first and second attachment structures defines a fastener opening and the other of the first and second attachment structures defines a fastening boss that aligns with the fastener opening with the exterior vehicle trim being in the final installed position.

10. The exterior vehicle body assembly according to claim 9, further comprising
a fastener that extends through the fastener opening and couples with the fastening boss to secure the exterior vehicle trim and the vehicle body panel together.

11. The exterior vehicle body assembly according to claim 10, wherein
the fastening boss includes an aperture and the fastener includes a bolt that is received into the aperture.

12. The exterior vehicle body assembly according to claim 1, wherein
one of the first and second attachment structures defines a locating opening and the other of the first and second attachment structures defines a locating projection that is received into the locating opening to assist in positioning the exterior vehicle trim into the final installed position.

13. The exterior vehicle body assembly according to claim 1, wherein
one of the vehicle body panel and the exterior vehicle trim defines a locating opening and the other of the vehicle body panel and the exterior vehicle trim defines a locating projection that is received into the locating opening to assist in positioning the first and second attachment structures into alignment with each other while the exterior vehicle trim is being positioned into the final installed position.

14. The exterior vehicle body assembly according to claim 13, wherein
the exterior vehicle trim includes a lower flange extending at least partially along a length of the exterior vehicle trim; and
the locating projection extends outwardly from the lower flange.

15. The exterior vehicle body assembly according to claim 1, wherein
the vehicle body panel includes a front bumper fascia panel.

16. The exterior vehicle body assembly according to claim 1, wherein
the exterior vehicle trim includes a fascia molding member.

17. The exterior vehicle body assembly according to claim 1 further comprising
a front headlamp mounted to the front bumper fascia panel, with the exterior vehicle trim being situated at least partially between a lens of the headlamp and the front bumper fascia panel in the final installed position.

18. The exterior vehicle body assembly according to claim 1, further comprising
a vehicle grille mounted to the vehicle body panel, with the vehicle grille overlaying an inboard end of the exterior vehicle trim such that the exterior vehicle trim is situated at least partially between the vehicle grille and the vehicle body panel in the final installed position.

19. The exterior vehicle body assembly according to claim 1, wherein
one of the first and second attachment structures defines an attachment opening, a fastener opening and a locating opening spaced from each other, and the other of the first and second attachment structures defines an attachment projection, a fastening boss and a locating projection spaced from each other, such that the attachment opening, the fastener opening and the locating opening align with the attachment projection, the fastening boss and the locating projection, respectively, with the exterior vehicle trim in the final installed position.

20. The exterior vehicle body assembly according to claim 19, wherein
the locating projection aligns with the locating opening while the exterior vehicle trim is being pivoted between the initial installation position and the final installed position to assist in aligning the attachment opening and the fastener opening with the attachment projection and the fastening boss, respectively.

* * * * *